US008296780B2

(12) United States Patent
Allen et al.

(10) Patent No.: US 8,296,780 B2
(45) Date of Patent: Oct. 23, 2012

(54) REDUCING PERSISTENCE COMMANDS

(75) Inventors: Nicholas A. Allen, Redmond, WA (US); Justin D. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 12/729,836

(22) Filed: Mar. 23, 2010

(65) Prior Publication Data

US 2011/0239230 A1 Sep. 29, 2011

(51) Int. Cl.
*G06F 13/00* (2006.01)
*G06F 9/45* (2006.01)
*G06F 17/30* (2006.01)
*G06F 12/00* (2006.01)

(52) U.S. Cl. ........ 719/321; 717/136; 717/137; 707/705; 707/763; 707/781; 707/E17.006

(58) Field of Classification Search .................... None
See application file for complete search history.

(56) References Cited

U.S. PATENT DOCUMENTS

| 5,721,904 | A | * | 2/1998 | Ito et al. ..................... 707/769 |
| 6,073,140 | A | * | 6/2000 | Morgan et al. ..................... 1/1 |
| 6,105,148 | A | | 8/2000 | Chung |
| 6,112,222 | A | | 8/2000 | Govindaraju |
| 6,442,748 | B1 | | 8/2002 | Bowman-Amuah |
| 6,457,003 | B1 | * | 9/2002 | Gajda et al. ..................... 1/1 |
| 6,457,065 | B1 | | 9/2002 | Rich |
| 6,591,277 | B2 | * | 7/2003 | Spence et al. ................. 707/792 |
| 6,934,755 | B1 | | 8/2005 | Saulpaugh |
| 7,305,423 | B2 | | 12/2007 | Starbuck |
| 7,313,727 | B2 | | 12/2007 | Cabrera |
| 7,349,512 | B2 | | 3/2008 | Rausch |
| 2002/0083252 | A1 | | 6/2002 | Armstrong |
| 2005/0132250 | A1 | | 6/2005 | Hansen |
| 2005/0262310 | A1 | | 11/2005 | Starbuck |
| 2005/0278341 | A1 | * | 12/2005 | Kostadinov et al. ............ 707/10 |
| 2006/0020570 | A1 | | 1/2006 | Wu |
| 2006/0136279 | A1 | | 6/2006 | Maybee |
| 2007/0156486 | A1 | | 7/2007 | Sanabria |
| 2008/0319957 | A1 | | 12/2008 | Muralidhar |
| 2009/0282396 | A1 | | 11/2009 | Boyer |
| 2010/0122239 | A1 | | 5/2010 | Neufeld |

(Continued)

OTHER PUBLICATIONS

Maria Del Mar Roldan-Garcia, "A Survey on Disk Oriented Querying and Reasoning on the Semantic Web", Proceedings of the 22nd International Conference on Data Engineering Workshops, 2006, 8 pages.

(Continued)

*Primary Examiner* — Charles E Anya
*Assistant Examiner* — Phuong Hoang
(74) *Attorney, Agent, or Firm* — Workman Nydegger

(57) ABSTRACT

The present invention extends to methods, systems, and computer program products for reducing persistence commands. An application host sends a persistence command to a persistence provider for processing. If the persistence provider recognizes and is able to carry out the persistence command, the persistence provider incorporates the semantics of the persistence command into the command implementation strategy; otherwise, the persistence provider employs a command reduction processor. The process of executing or reducing persistence commands is repeated until the persistence provider has produced and completed execution of a command implementation strategy equivalent to the original persistence command or until an unprocessable persistence command is reached for which no further reductions are possible. A command reduction processor can provide alternative persistence commands or an algorithm of persistence commands with semantics equivalent to an originally received persistence command.

19 Claims, 6 Drawing Sheets

U.S. PATENT DOCUMENTS

2010/0319006 A1    12/2010    Allen
2011/0138398 A1    6/2011    Allen

OTHER PUBLICATIONS

Lumpp, Th., et al., "From high availability and disaster recovery to business continuity solutions", IBM Systems Journal, vol. 47, No. 4, Jun. 3, 2008, pp. 605-619.

MSDN, "Load Workflow Command Class", 2010 Microsoft Corporation, 2 pages.

Rodriguez, Jesus, "Jesus Rodriguez's WebLog", Microsoft MVP BizTalk Server Oracle ACE, Oct. 5, 2005, 16 pages.

MSDN, "Instance Stores", 2010 Microsoft Corporation, 3 pages.

Sun Microsystems, "Sun Java System Application Server 9.1 Developer's Guide", May 2008, 316 pages.

Wang, Lan, et al., "Persistent Detection and Recovery of State Inconsistencies", Aug. 8, 2006, 23 pages.

Rodriguez, Jesus, Window Workflow Foundation Runtime Services; The Persistence Service:, Oct. 5, 2005 14 pages.

Raynal, Michel, et al. "Logical Time: Capturing Causality in Distributed Systems", Feb. 1996, pp. 49-56.

Liskov, Barbara, et al., "Providing Persistent Objects in Distributed Systems", Proceedings of ECOOP'99, 1999, 28 pages.

Notice of Allowance dated Mar. 13, 2012 cited in U.S. Appl. No. 12/485,771.

Adya, Atul, et al., "Efficient Optimistic Concurrency Control Using Loosely Synchronized Clocks", Proceedings of the ACM SIGMOD International Conference on Management of Data, San Jose, CA, May 1995, 12 pages.

Kahlon, V. et al, "Reasoning about Threads Communicating via Locks Computer Aided Verification", Lecture Notes in Computer Science, 2005, vol. 3576/2005, pp. 267-274.

Rajwaro, R. et al., "Transactional Execution: Toward Reliable, High-Performance Multithreading", IEEE Computer Society, IEEE Micro, 2003, vol. 23, No. 6, pp. 117-125.

Notice of Allowance dated May 11, 2012 cited in U.S. Appl. No. 12/485,771.

U.S. Appl. No. 13/484,911, May 31, 2012, Allen.

\* cited by examiner

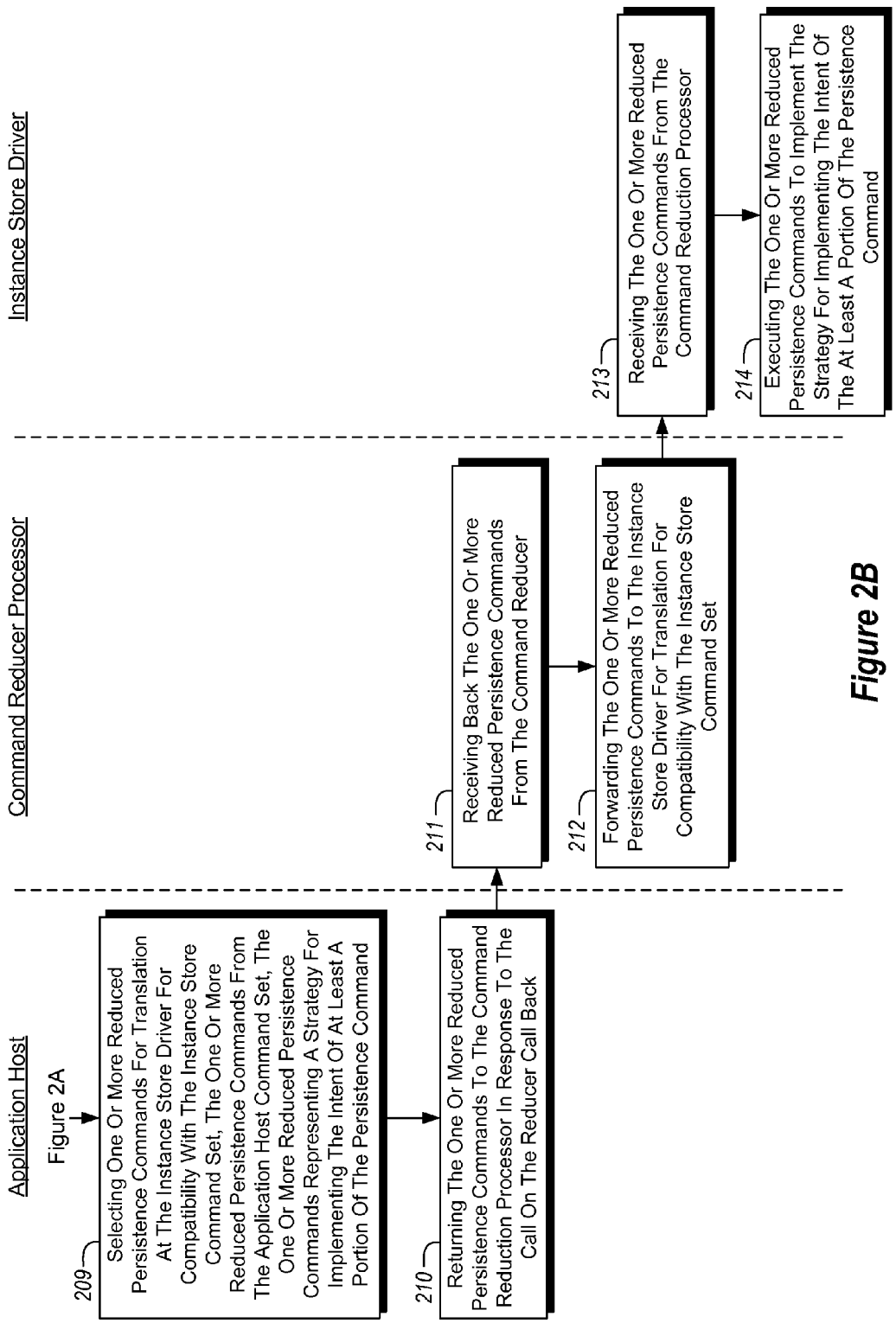

REDUCING PERSISTENCE COMMANDS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Long-running applications, such as, for example, workflow applications, often benefit from periodically persisting their work to allow for the application to recover after errors, crashes, or machine failures. Persisting work permits applications to temporarily go idle and have their resources reassigned. To persist work, an application host coordinates the persisted state with runtime state to ensure that a consistent checkpoint is created. For example, the persisted state may need to coordinate with application transactions, message notifications, locks, local state caches, etc.

Many approaches to persisting work include a tightly coupled application host and state persistence system. That is, an application host is specifically designed to operate with the state persistence system and vice versa. Thus, to achieve new functionality using these approaches, both the application host and state persistence system must be updated simultaneously. Additionally, the tight coupling used in many approaches limits the interoperability of application hosts and state persistence systems. That is, unless an application host and state persistence system are specifically designed for one another, there is little, if any, potential for interoperation.

Further, there are any number of different application hosts, storage systems, and storage schemas that exist. As such, even if these types of work persistence components were to be grouped together in a looser coupling (i.e., combining components not necessary designed specifically for one another) an essentially limitless number of combinations may exist, each with their own particular strengths and weaknesses. Thus, application authors may have a variety of preferred implementations for persisting work.

However, since the work persistence components are not tightly coupled (and possibly not even owned by the same entity) there are some combinations of work persistent components that are simply not compatible with one another. Further, the functionality of different components can diverge over time. For example, subsequent to application development, the deployment of the application may make use of persistence systems that incorporate features not envisioned by the application author. Conversely, for reasons such as licensing costs, testing costs, environmental constraints, or historical legacy, deployment of an application may be done against a persistence system lacking some of the features expected by the application author. Accordingly, there is always some chance (either initially or over time) that feature set differences between work persistence components will limit, and possibly prevent, an application's intended operation when using particular combinations of work persistence components.

BRIEF SUMMARY

The present invention extends to methods, systems, and computer program products for reducing persistence commands. A persistence provider is situated between an application host and an instance store. The persistence provider facilitates translation of persistence commands between an application host command set and an instance store command set. A command reduction processor includes additional functionality to translate otherwise incompatible persistence commands between the application host command set and the instance store command set.

The application host sends a persistence command and a reducer call back to an instance persistence command processor in the persistence provider. The persistence command is from the application host command set. The reducer call back is for calling a command reducer component for the persistence command. The command reducer component provides one or more implementation strategies for the persistence command.

An instance store driver in the persistence provider receives the persistence command and the reducer call back from the instance persistence command processor. The instance store driver detects an inability to translate the persistence command for compatibility with the instance store command set. The instance store driver sends the persistence command along with the reducer call back to the command reduction processor in response to detecting the inability to translate the persistence command.

The command reduction processor receives the persistence command along with the reducer call back from the instance store driver. The command reduction processor uses the reducer call back to call the command reducer component for the persistence command. The application host receives the call from the command reduction processor on the reducer call back.

The application host invokes the command reducer component in response to the call from the command reduction processor. The command reducer component selects one or more reduced persistence commands for translation at the instance store driver for compatibility with the instance store command set. The one or more reduced persistence commands are from the application host command set and represent a strategy for implementing the intent of at least a portion of the persistence command. The command reducer component returns the one or more reduced persistence commands to the command reduction processor in response to the call on the reducer call back.

The command reduction processor receives back the one or more reduced persistence commands from the command reducer. The command reduction processor forwards the one or more reduced persistence commands to the instance store driver for translation for compatibility with the instance store command set. The instance store driver receives the one or more reduced persistence commands from the command reduction processor. The instance store executes the one or more reduced persistence commands to implement the strategy for implementing the intent of the at least a portion of the persistence command.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2A and 2B illustrate a flow chart of an example method for reducing a persistence command.

DETAILED DESCRIPTION

Figure 1:
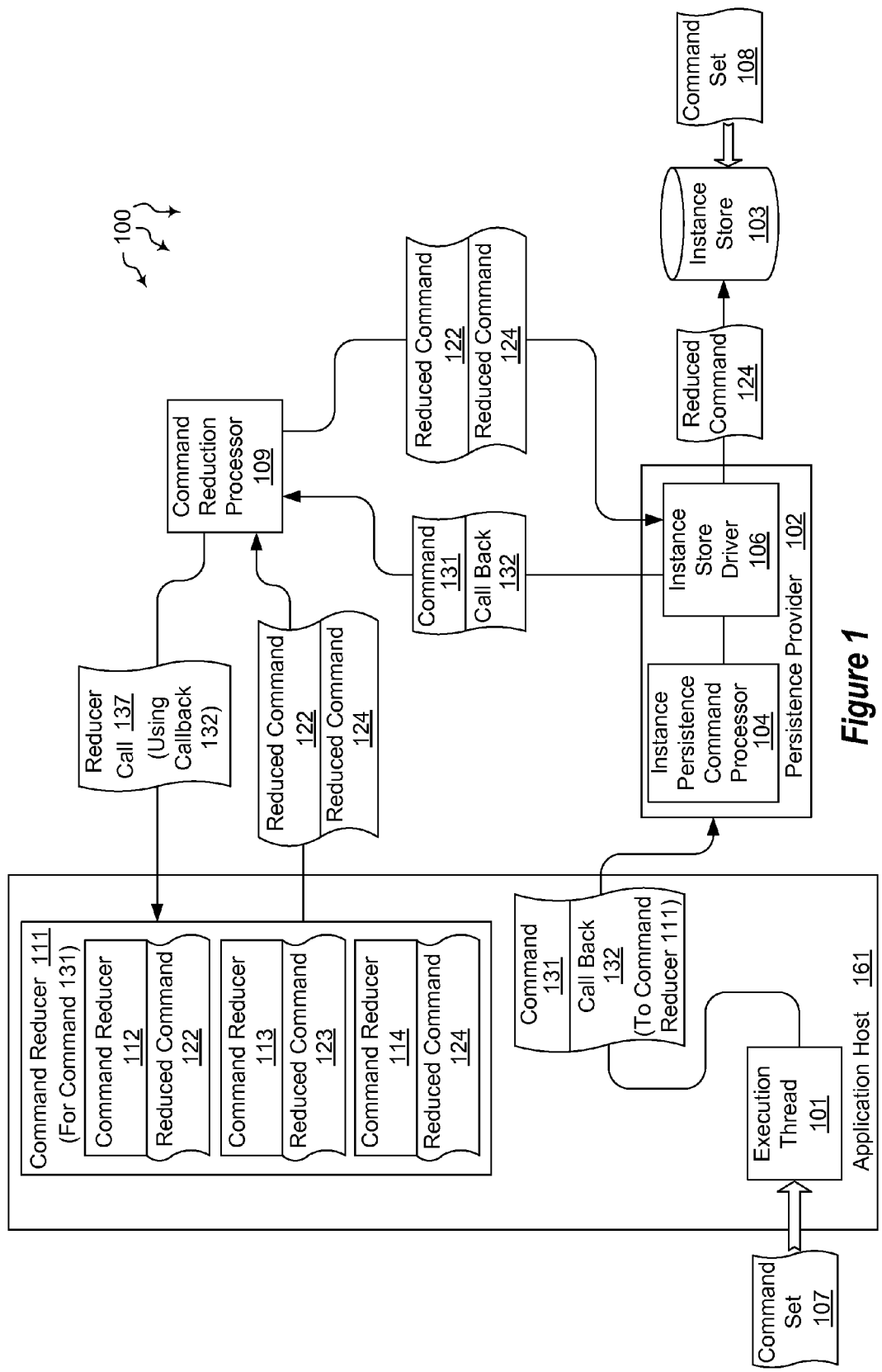
FIG. 1 illustrates an example computer architecture that facilitates reducing persistence commands.

The present invention extends to methods, systems, and computer program products for reducing persistence commands. A persistence provider is situated between an application host and an instance store. The persistence provider facilitates translation of persistence commands between an application host command set and an instance store command set. A command reduction processor includes additional functionality to translate otherwise incompatible persistence commands between the application host command set and the instance store command set.

The application host sends a persistence command and a reducer call back to an instance persistence command processor in the persistence provider. The persistence command is from the application host command set. The reducer call back is for calling a command reducer component for the persistence command. The command reducer component provides one or more implementation strategies for the persistence command.

An instance store driver in the persistence provider receives the persistence command and the reducer call back from the instance persistence command processor. The instance store driver detects an inability to translate the persistence command for compatibility with the instance store command set. The instance store driver sends the persistence command along with the reducer call back to the command reduction processor in response to detecting the inability to translate the persistence command.

The command reduction processor receives the persistence command along with the reducer call back from the instance store driver. The command reduction processor uses the reducer call back to call the command reducer component for the persistence command. The application host receives the call from the command reduction processor on the reducer call back.

The application host invokes the command reducer component in response to the call from the command reduction processor. The command reducer component selects one or more reduced persistence commands for translation at the instance store driver for compatibility with the instance store command set. The one or more reduced persistence commands are from the application host command set and represent a strategy for implementing the intent of at least a portion of the persistence command. The command reducer component returns the one or more reduced persistence commands to the command reduction processor in response to the call on the reducer call back.

The command reduction processor receives back the one or more reduced persistence commands from the command reducer. The command reduction processor forwards the one or more reduced persistence commands to the instance store driver for translation for compatibility with the instance store command set. The instance store driver receives the one or more reduced persistence commands from the command reduction processor. The instance store executes the one or more reduced persistence commands to implement the strategy for implementing the intent of the at least a portion of the persistence command.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates reducing persistence commands. Referring to FIG. 1, computer architecture 100 includes application host 161, persistence provider 102, instance store 103, and command reduction processor 109. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, application host 161 is configured to issue persistence commands contained in command set 107. Application host 161 can send (e.g., persistence) commands along with accumulated context information for an instance store (e.g., instance store 103). Context information can be accumulated through prior interactions with the instance store. Application host 161 can also present views containing application state from the instance store. Application host 161 can be an entity, such as, for example, a program or administrative tool that manipulates instances stored in an instance store.

Application host 161 can include one or more execution threads, such as, for example, execution thread 101. Generally, execution threads are configured to issue (e.g., persistence) commands for interacting with instances in an instance store (e.g., instance store 103). In some embodiments, execution threads, such as, for example, execution thread 101, can correspond to a program sequence of a long-running application. However, an execution thread may not directly correspond to the computation threads provided by the operating system. For example, in an application host runtime that supports asynchronous execution or resumption from continuation points, the binding of an execution thread to a computation thread may be dynamic and transient. Thus, some or all of the application host execution threads may be executing simultaneously on one or more computation threads.

Each execution thread of application host 161, including execution thread 101, is configured to perform many of the functions of application host 161. For example, an execution thread can be configured to request an instance handle for instance store 103 from persistence provider 102, submit persistence commands to instance persistence command processor 104, and receive persisted application state responsive to the submitted persistence commands. As such, generally references made to functions being performed by an application host can include functions performed by execution threads of the application host.

Application host 161 can also include one or more command reducers, such as, for example, command reducer 111. Each command reducer can provide one or more implementation strategies for implementing a persistence command from command set 107. For example, command reducer 111 includes reduced commands 122, 123, and 124 that can be combined in one or more different combinations to provide strategies for implementing command 131. Each command reducer can also include further command reducers for use when a reduced command is to be further reduced. For example, command reducer 111 includes command reducers 112, 113, and 114 that can be used to further reduce reduced commands 122, 123, and 124 respectively when appropriate. Virtually any amount of command reducer and reduced command nesting possible.

When other components in computer architecture 100 are otherwise unable to translate a persistence command from command set 107, these other components can refer to an appropriate command reducer for assistance. Accordingly, when application host 161 issues a persistence command, application host 161 can include a call back to the appropriate command reducer along with the persistence command.

Instance store 103 provides durable storage for instances. Instance store 103 is configured to receive and process persistence commands contained in command set 108 for interacting with instances. Instance store 103 can persist application state as well as return persisted state to a requesting entity in response to persistence commands.

Generally, persistence provider 102 is configured to translate persistence commands from one command set into persistence commands in another different command set. For example, persistence provider 102 can translate persistence commands contained in command set 107 into persistence commands contained in command set 108. Thus, persistence provider 102 can translate persistence commands from application host 161 into persistence commands compatible with instance store 103.

As depicted, persistence provider 102 includes instance persistence command processor 104 and instance store driver 106. Instance persistence command processor 104 defines the contract between application host 161 and instance store 103. As such, instance persistence command processor 104 is an interface between application host 161 and instance store 103 that permits application host 161 to provide commands that modify or inspect instance store 103. For example, the combination of instance persistence command processor 104 and an instance store driver 106 implemented using SQL Server might be called a SQL persistence provider (e.g., 102). As such, persistence provider 102 modifies the state of instance store 103 according to a host's commands (e.g., commands from application host 161) using a set of permissible state modifications defined by instance persistence command processor 104.

Instance store driver 106 is configured to break down commands, when appropriate, for compatible communication with instance store 103. For example, command set 108 may lack a particular command from command set 107. However, it may be that using a combination of two or more commands from command set 108, that the command from command set 107 can be realized. Thus, when persistence provider 102 detects that a persistence command is not included in command set 108, persistence provider can refer to instance store driver 106 to break the command down into other compatible commands.

In some embodiments, instance store driver 102 detects an inability to translate a persistence command from command set 107 into compatible commands in command set 108. As depicted, computer architecture 100 further includes command reduction processor 109. When instance store driver 106 detects an inability to translate a persistence command from command set 107, instance store driver 106 can send the persistence command (and reducer call back) to command reduction processor 109 for further processing.

Generally, command reduction processor 109 can provide alternative persistence commands or an algorithm of persistence commands with semantics equivalent to an originally received persistence command. In some embodiments, command reduction processor 109 has the native ability to reduce a persistence command from command set 107 into command set 108 for compatibility with instance store 103. In these embodiments, command reduction processor 109 breaks a persistence command into one or more reduced persistence commands compatible with command set 108 for implementing the intent of the persistence command from command set 107. Command reduction processor 109 returns the one or more reduced persistence commands back to instance store driver 106.

In other embodiments, command reduction processor 109 lacks the native ability to reduce a persistence command from command set 107 into command set 108 for compatibility with instance store 103. In these other embodiments, command reduction processor 109 uses a reducer call back to call the appropriate command reducer for the persistence command. The command reducer returns one or more reduced persistence commands from command set 107 for translation at instance store driver 106 for compatibility with command set 108. The one or more reduced commands represent a strategy for implementing the intent of the persistence command from command set 107. Command reduction processor 109 returns the one or more reduced persistence commands back to instance store driver 106.

A command reducer may have a plurality of different combinations of one or more reduced persistence commands for implementing a persistence command. An appropriate combination of one or more reduced persistence commands can be selected as a strategy for implementing the persistence command based on the performance and functionality of instance store 103.

Multiple iterations between instance store driver 106 and command reduction processor 109 can be used to translate a persistence command from command set 107 into one or more reduced persistence commands compatible with command set 108. When appropriate, iterations between instance store driver 106 and command reduction processor 109 can include using nested command reducers and reduced commands to further reduce a persistence command. Command reduction processor 109 can also refer to other components, such as, for example, a command compiler, when generating one or more reduced persistence commands.

Figure 2A:
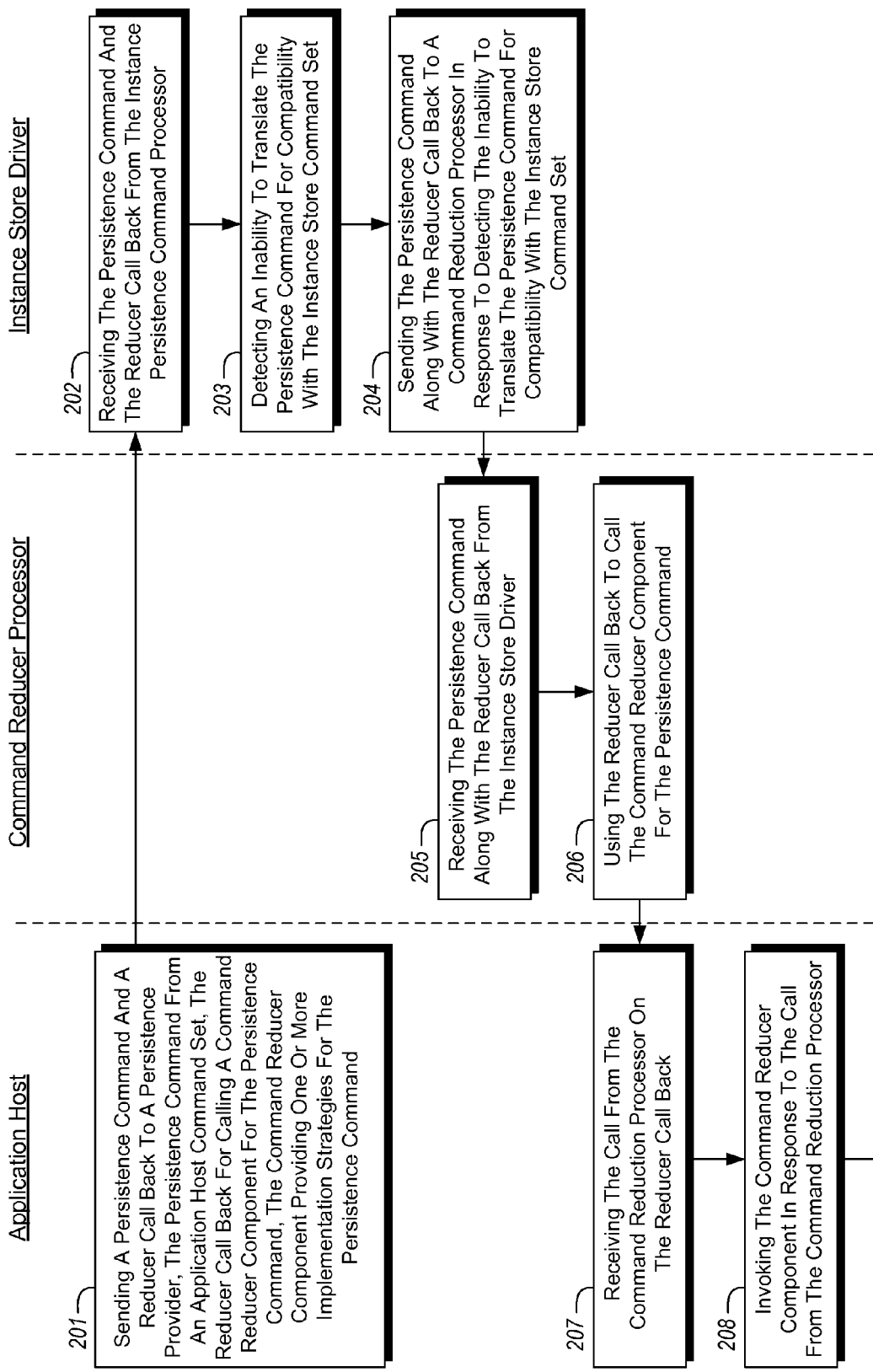

FIGS. 2A and 2B illustrate a flow chart of an example method 200 for reducing a persistence command. Method 200 will be described with respect to the components and data of computer architecture 100.

Method 200 includes an act of sending a persistence command along with a reducer call back to a persistence provider, the persistence command from an application host command set, the reducer call back for calling a command reducer component for the persistence command, the command reducer providing one or more implementation strategies for the persistence command (act 201). For example, execution thread 101 can send command 131 and call back 132 to persistence provider 102. Command 131 can be a persistence command from command set 107. Call back 132 can be a reducer call back for calling command reducer 111. Command reducer 111 can be a command reducer for command 131 that provides one or more implementation strategies for implementing command 131.

Method 200 includes an act of receiving the persistence command and the reducer call back from the instance persistence command processor (act 202). For example, upon receiving command 131, persistence provider 102 can forward command 131 and call back 132 to instance persistence command processor and instance store driver 106 for translation into command set 108. Instance store driver 106 can receive command 131 and call back 132 from persistence provider 102.

Instance store driver 106 can attempt to translate command 131 for compatibility with command set 108.

Method 200 includes an act of detecting an inability to translate the persistence command for compatibility with the instance store driver command set (act 203). For example, instance store driver 106 can detect an inability to translate command 131 for compatibility with command set 108. Method 200 includes an act of sending the persistence command along with the reducer call back to a command reduction processor in response to detecting the inability to translate the persistence command for compatibility with the instance store driver command set (act 204). For example, instance store driver 106 can send command 131 and call back 132 to command reduction processor 109 in response to detecting an inability to translate command 131 for compatibility with command set 108.

Method 200 includes an act of receiving the persistence command along with the reducer call back from the instance store driver (act 205). For example, command reduction processor 109 can receive command 131 and call back 132 from instance store driver 106. Method 200 includes using the call back to call the command reducer component for the persistence command (act 206). For example, command reduction processor 109 can issue reducer call 137 (using call back 132) to call command reducer 111 (for command 131).

Method 200 includes an act of receiving the call from the command reduction processor on the reducer call back (act 207). For example, application host 161 can receive reducer call 137 on call back 132. Method 200 includes an act of invoking the command reducer component in response to the call from the command reduction processor (act 208). For example, application host 161 can invoke command reducer 111 in response to reducer call 137.

Method 200 includes an act of selecting one or more reduced persistence commands for translation at the instance store driver for compatibility with the instance store command set, the one or more reduced persistence commands from the application host command set, the one or more reduced persistence commands representing a strategy for implementing the intent of at least a portion of the persistence command (act 210). For example, command reducer 111 can select reduced commands 122 and 124 for translation at instance store driver 106 for compatibility with command set 108. Reduced commands 122 and 124 can be commands from command set 107. Reduced commands 122 and 124 can represent a strategy for implementing the intent of at least a portion of command 131.

The combination of reduced commands 122 and 124 can be one of one or more different combinations of commands representing corresponding different strategies for implementing the intent of at least a portion of command 131. In some embodiments, there is a preferred strategy and one or more alternate strategies for implementing a persistence command. Selection of a preferred or alternate strategy can be based on one or more of: the performance, functionality, and configuration of other components. Thus, the selection of reduced commands 122 and 124 (whether representing a preferred or alternate strategy for implementing command 131) can be based on one or more of: the performance, functionality, and configuration of other components in computer architecture 100 (including instance store driver 106 and instance store 103).

Method 200 includes an act of returning the one or more reduced persistence commands to the command reduction processor in response to the call on the reducer call back (act 210). For example, application host 161 can return reduced commands 122 and 124 to command reduction processor 109 in response to reducer call 137. Method 200 includes an act of receiving back the one or more reduced persistence commands from the command reducer (act 211). For example, command reduction processor 109 can receive reduced commands 122 and 124 from application host 161.

Method 200 includes an act of forwarding the one or more reduced persistence commands to the instance store driver for translation for compatibility with the instance store command set (act 212). For example, command reduction processor 109 can forward reduced commands 122 and 124 to instance store driver 106 for translation for compatibility with command set 108. Method 200 includes an act of receiving the one or more reduced persistence commands from the command reduction processor (act 213). For example, instance store driver 106 can receive reduced commands 122 and 124 from command reduction processor 109.

Method 200 includes an act of executing the one or more reduced persistence commands to implement the strategy for implementing the intent of the at least a portion of the persistence command (act 214). For example, instance store driver 106 can execute reduced commands 122 and 124 to implement a strategy for implementing at least a portion of command 131. Instance store driver 106 can execute commands, such as, for example, reduced command 122 locally. Instance store driver 106 can submit other commands, such as, for example, reduced command 124 to instance store 103. Instance store driver 106 can also perform further translation on reduced commands prior to execution and/or submission to instance store 103.

In some embodiments, a selected strategy fully implements the intent of a persistence command. For example, reduced commands 122 and 124 can represent a strategy for fully implementing the intent of command 131. In other embodiments, a selected strategy partially implements the intent of a persistence command. For example, reduced commands 122 and 124 can represent a strategy for partially implementing the intent of command 131.

In these partial implementation embodiments, partial results may be returned back to an application host. The application host can use the partial results to complete further computations using a native implementation of the persistence command. For example, application host 161 may receive back partial results for command 131 from the execution of reduced command 122 and 124. Application host 161 can use the partial results to perform further computations relevant to command 131.

Figure 3:
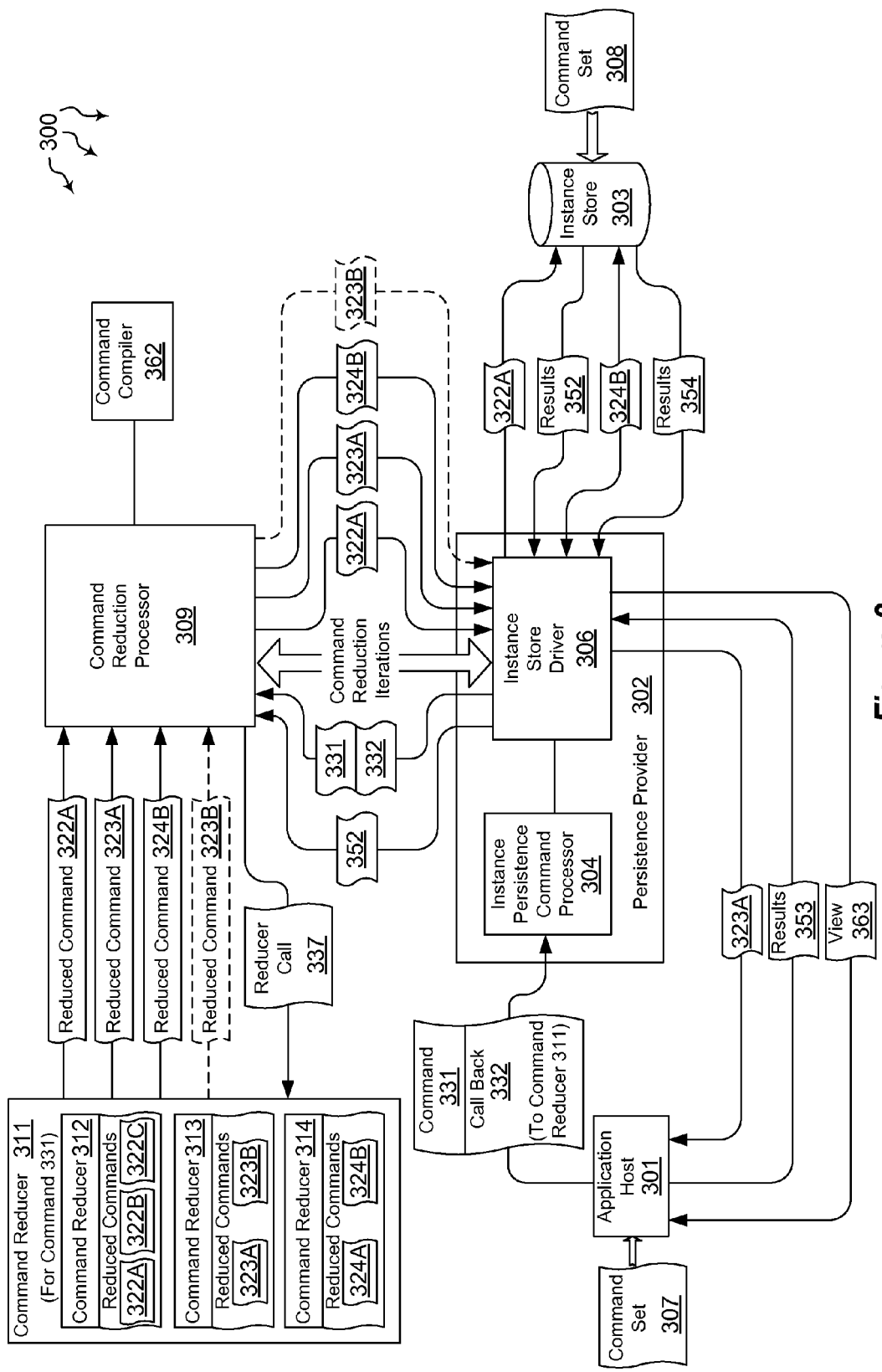
FIG. 3 illustrates another example computer architecture that facilitates reducing persistence commands.

FIG. 3 illustrates another example computer architecture 300 that facilitates reducing persistence commands. Referring to FIG. 3, computer architecture 300 includes application host 301, persistence provider 302, instance store 303, command reduction processor 309, and command compiler 362. Persistence provider 302 further includes instance persistence command processor 304 and instance store driver 306. Similar to computer architecture 100, each of the depicted components in computer architecture 300 can be connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data over the network.

The functionality of components in computer architecture 300 is similar to the similarly named components of computer architecture 100. As such, application host 301 is configured to issue persistence commands contained in command set 307. Application host 301 can send a reducer call back along with a persistence command. For example, application host 301 can send command 331 along with call back 332 (to reducer component 311).

Command reducer 311 can provide one or more implementation strategies for implementing the intent of command 331. As depicted, command reducer 311 includes command reducers 312, 313, and 314. Each command reducer corresponds to one or more reduced commands that can be included in a strategy for implementing command 331. For example, command reducer 312 corresponds to reduced commands 322A, 322B, and 322C, command reducer 313 corresponds to reduced commands 323A and 323B, and command reducer 314 corresponds to reduced commands 324A and 324B.

When other components in computer architecture 300 are otherwise unable to translate command 331, these other components can refer to command reducer 311 for assistance. Accordingly, when application host 301 issues persistence command 331, application host 301 can include call back 332 (to command reducer 311).

Instance store 303 provides durable storage for instances. Instance store 303 is configured to receive and process persistence commands contained in command set 308 for interacting with instances. Instance store 303 can persist application state as well as return persisted state to a requesting entity in response to persistence commands.

Persistence provider 302 is configured to translate persistence commands from one command set into persistence commands in another different command set. For example, persistence provider 302 can translate persistence commands contained in command set 307 into persistence commands contained in command set 308. Thus, persistence provider 302 can translate persistence commands from application host 301 into persistence commands compatible with instance store 303.

As depicted, persistence provider 302 includes instance persistence command processor 304 and instance store driver 306. Instance persistence command processor 304 defines the contract between application host 301 and instance store 303. As such, instance persistence command processor 304 is an interface between application host 301 and instance store 303 that permits application host 301 to provide commands that modify or inspect instance store 303.

Instance store driver 306 is configured to break down commands, when appropriate, for compatible communication with instance store 303. For example, command set 308 may lack a particular command from command set 307. However, it may be that using a combination of two or more commands from command set 308, that the command from command set 307 can be realized. Thus, when persistence provider 302 detects that a persistence command is not included in command set 307, persistence provider 302 can refer to instance store driver 306 to break the command down into other compatible commands.

As previously described, instance store driver 306 can detect an inability to translate a persistence command from command set 307 into compatible commands in command set 308. When instance store driver 306 detects an inability to translate a persistence command from command set 307, instance store driver 306 can send the persistence command (and reducer call back) to command reduction processor 309 for further processing.

In some embodiments, command reduction processor 309 lacks the native ability to reduce a persistence command from command set 307 into command set 308 for compatibility with instance store 303. In these embodiments, command reduction processor 309 uses a reducer call back to call the appropriate command reducer for the persistence command and/or can invoke command compiler 362.

Command compiler 362 is configured to dynamically generate expressions, cross-language translations, or executable programs to perform a persistence command or portion of a persistence command. Command reduction processor 309 can invoke command compiler 362 when a persistence command or algorithm over a collection of persistence commands needs to be translated to another form for execution.

As depicted, application host 301 sends persistence command 331 (from command set 307) along with call back 332 (to command reducer 311) to instance persistence command processor 304. Command 331 along with call back 332 is eventually forwarded to instance store driver 306. Instance store driver 306 detects an inability to translate command 331 for compatibility with command set 308. In response, instance store driver 306 and command reduction processor 309 perform one or more command reduction iterations. The one or more command reduction iterations reduce command 331 into one or more reduced commands that both represent a strategy for implementing command 331 and that are compatible to the extent possible with command set 308. In some embodiments, instance driver 306 and command reduction processor 309 go back and forth performing an algorithm over several persistence commands.

To initiate the one or more command reduction iterations, instance driver store 306 can send command 331 along with reducer call back 332 to command reduction processor 309. The production of reduced persistence commands by command reduction processor 309 can take a variety of different forms.

There may be a preferred implementation of persistence command 331 using one or more reduced commands supported by instance store 303. For example, in embodiments where instance store 303 is an SQL database, a stored procedure may provide functionality required by persistence command 331.

There may also be one or more alternative implementations of persistence command 331. Alternative implementations may be less desirable than a preferred implementation due to perhaps poorer performance, reduced functionality, or requiring special configuration. For example, in embodiments where instance store 303 is an SQL database, command reduction processor 309 may be able to invoke command compiler 362. Command compiler 362 can produce a SQL script corresponding to the functionality required by persistence command 331 and upload the script for execution on the database machine. The use of a dynamically generated script may cause persistence command 331 to run slower than if a precompiled procedure had been used and introduce a security threat for a SQL injection attack.

Failing other means of performing persistence command 331, persistence provider 302 may be able to bring partially completed results back to the machine running application host 301 and complete the computation using a native implementation of persistence command 331. A host implementation may be even less desirable than an alternative implementation due to the extra round-trip introduced between the machines. For example, command reduction processor 309 may be able to retrieve data from instance store 303, execute an algorithm provided by application host 301 on the retrieved data, and return the processed data to the instance store.

Thus, upon receiving persistence command 331 and reducer call back 332, command reduction processor 309 can issue reducer call 337 (using call back 332) to call command reducer 311 and/or can invoke command compiler 362. Command reduction processor 309 can maintain state between iterations and view the results of previous persistence commands before returning the next persistence command. For example, the command reduction processor 309 may provide algorithms for sequential execution, parallel execution, conditional execution, loops, or other control flows as persistence commands are presented.

In some embodiments, command reduction processor 309 reduces persistence command 331 by substituting another persistence command for persistence command 331, rather than breaking the command into smaller pieces. For example, there may be a prioritized list of preferred and alternative implementations according to factors such as performance or required permissions. Command reduction processor 309 may use command reduction iterations as a protocol for negotiating with instance store driver 306 to determine the most-optimal supported implementation of persistence command 331.

As such, command reduction processor 309 can be invoked repeatedly during execution of a persistence command. For example, the reduction of persistence command 331 may result in the production of three other persistence commands (e.g., reduced commands 322A, 323A, and 324B). Instance store driver 306 may successfully complete reduced command 322A before discovering it does not know how to process reduced command 323A. Instance store driver 306 can again invoke command reduction processor 309 to further reduce reduced command 323A. When appropriate, command reduction processor 309 can call command reducer 313 to further reduce reduced command 323A.

During the reduction process, instance store driver 306 may eventually reach a persistence command that it does not understand and for which command reduction processor 309 is unable to provide any further assistance in providing reductions. When this occurs, instance store driver 306 may fail execution of the initial persistence command and return an error to the application host (e.g., 301).

An example of applying a series of reductions to a persistence command will now be described with respect to components of computer architecture 300. Application host 301 submits persistence command 331 along with call back 332 to persistence provider 302. Instance store driver 306 detects that it is unable to translate persistence command 331. In response, instance store driver submits persistence command 331 and call back 332 to command reduction processor 309. Through one or more command reduction iterations (possibly also including command compiler 362), the sequence of reduced commands 322A, 323A, and 324B is reached. Reduced commands 322A, 323A, and 324B represent a portion of persistence command 331.

For example, reduced commands 322A, 323A, and 324B may implement loading an instance when a particular condition is true. However, instance store 303 may not support the testing of a condition while loading an instance. As such, reduced command 322A may be a script that instance store 303 can execute to resolve an identifier to a particular instance. Reduced command 323A may be a call back to the application host 301 to evaluate the required condition. Reduced command 324B may be a script that instance store 303 can execute to complete the loading of the instance, when the results of performing reduced command 323A indicate that the load is to proceed.

The creation of the specific sequence of reduced commands is in part an artifact of executing the reduced commands. That is, the selection of later reduced commands for inclusion in a sequence can depend on the results of early executed reduced commands.

For example, instance store driver 306 can submit reduced command 322A to instance store 303 to attempt to resolve an identifier to a particular instance. Instance store 303 attempts to implement reduced command 322A and returns results 352 back to instance store driver 306. Results 352 can indicate the success or failure of reduced command 322A. Results 352 can be forwarded onto command reduction processor 309. Command reduction processor 309 can use results 352 to determine the next reduced command in the sequence. As depicted, results 352 indicate success (i.e., an instance with that identifier exists) and command reduction processor 309 selects/generates reduced command 323A as the next command for inclusion in the sequence. On the other hand, if results 352 had indicated failure (i.e., no instance with that identifier exists), command reduction processor 309 may have alternately selected/generated command 323B (as indicated by the dashed lines) for inclusion in the sequence. In either case, results 352 represent an intermediate view of the state of the system during execution of persistence command 331.

Instance store driver 306 subsequently submits reduced command 323A along with results 352 (the identifier to the particular instance) to application host 301. Application host 301 evaluates the required condition and returns results 353 (e.g., condition is satisfied or condition is not satisfied) to instance store driver 306. Results 353 represent an intermediate view of the state of the system during execution of persistence command 331.

Instance store driver 306 subsequently submits reduced command 324B to instance store 303 along with results 353 (indicating whether or not the condition is satisfied) to instance store 303. Instance store 303 attempts to load the particular instance and returns results 354 (indicating success or failure of the load). Results 354 represent an intermediate view of the state of the system during execution of persistence command 331.

Subsequently, instance store driver 306 completes execution of other portions of persistence command 331 and returns view 363 to application host 301. View 363 is a view of the state of instance store 303 consistent with the atomic execution of persistence command 331 as received from application host 301.

Figure 4:
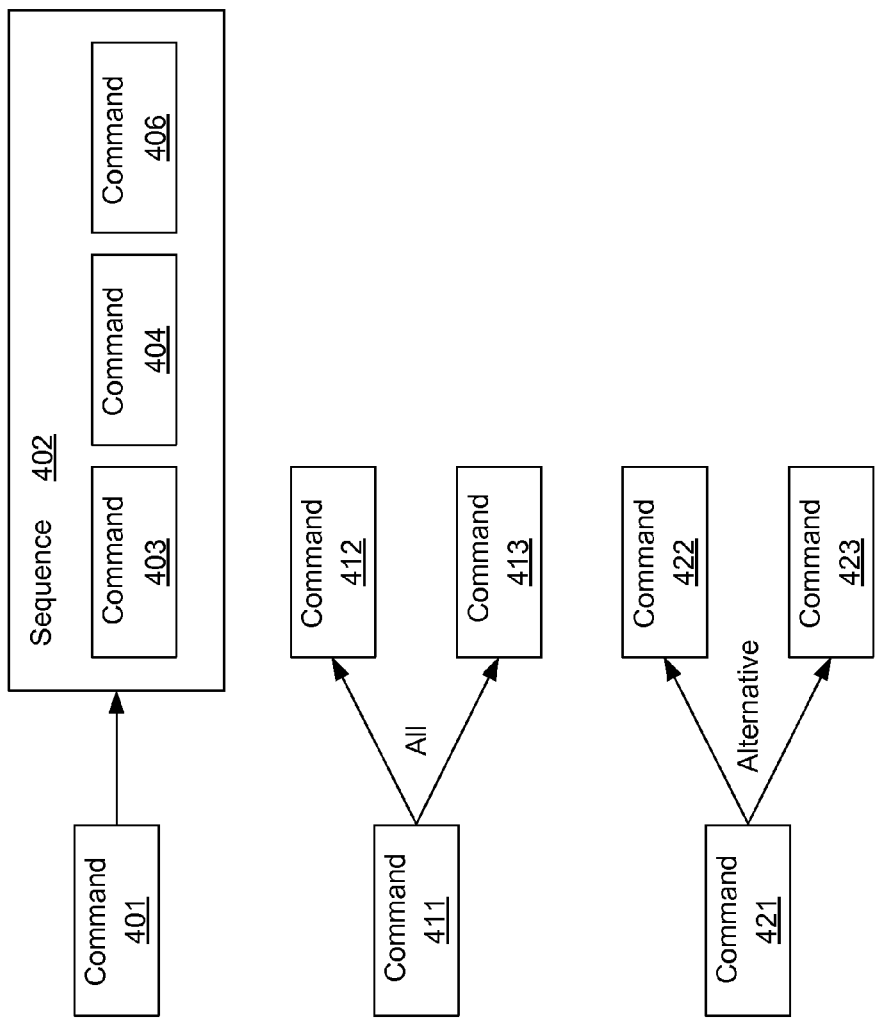
FIG. 4 illustrates examples of possible reduced persistence command alternatives representing strategies for implementing a persistence command.

FIG. 4 illustrates examples of possible reduced persistence command alternatives representing strategies for implementing a persistence command. In some embodiments, implementing a strategy for a persistence command includes generating a sequence of reduced commands. For example, persistence command 401 can be reduced to sequence 402, including commands 403, 404, and 406. In some embodiments, reduced commands are configured for execution in a specified order. For example, reduced command 403, 404 and 406 can be configured for execution in that order. Ordering can be used, for example, when a later executing reduced command depends on the results from an earlier executing reduced command. In other embodiments, ordering is not relevant for one or more reduced operations.

In some embodiments, implementing a strategy for a persistence command includes generating a plurality of reduced commands requiring execution. For example, persistence command 411 can be reduced to commands 412 and 413, which as indicated by the "ALL" are both to be executed. In other embodiments, implementing a strategy for a persistence command includes generating a plurality of alternate reduced commands. For example, persistence command 421 can be reduced to commands 422 and 423, which as indicated by the "Alternative" can alternately be executed.

Figure 5:
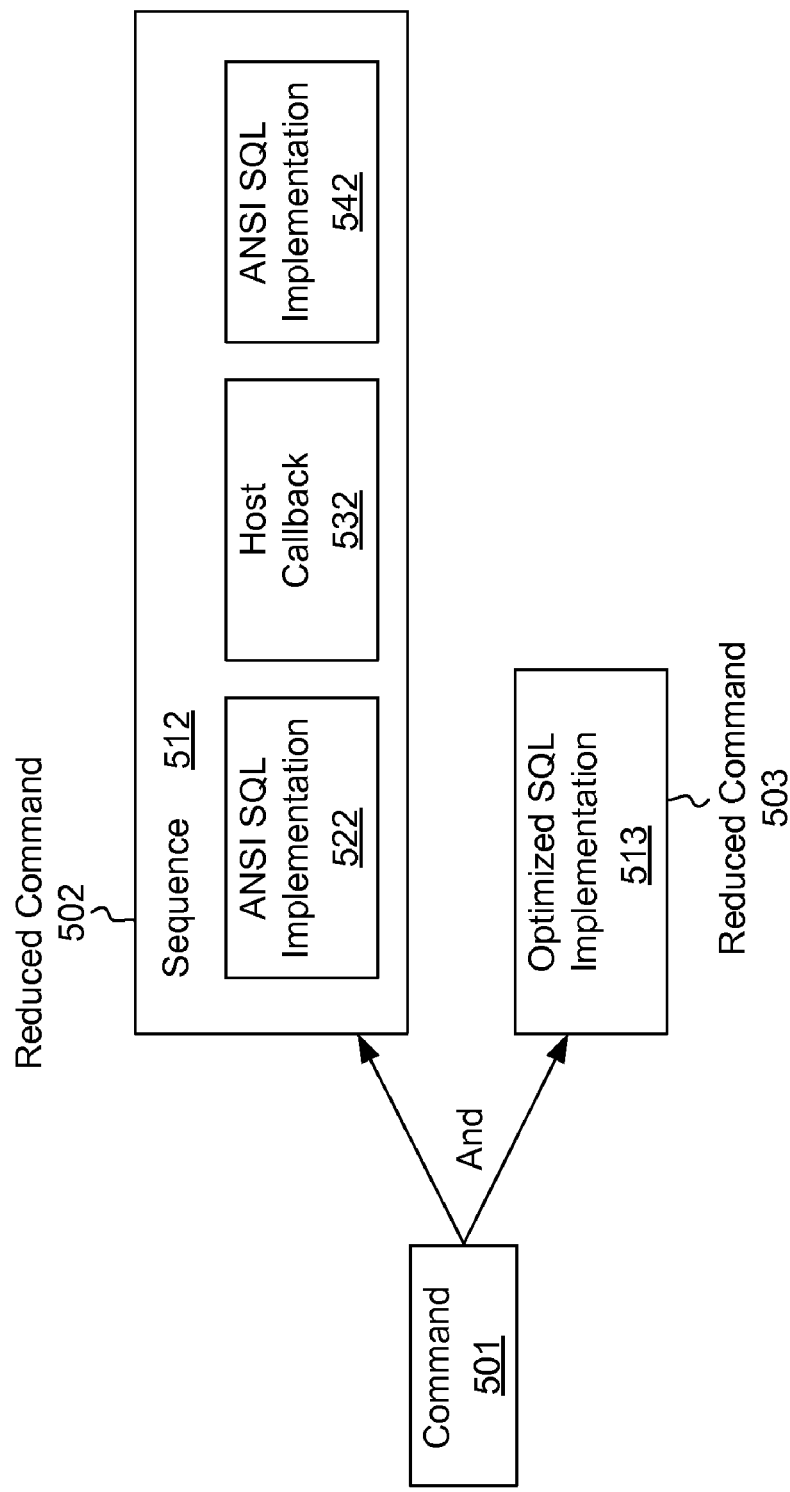
FIG. 5 illustrates an example of applying a series of reductions to a persistence command.

FIG. 5 illustrates an example of applying a series of reductions to persistence command 501. Initially, the reduction of persistence command 501 (e.g., by command reduction processor 109 or 309) results in reduced command 502 and reduced command 503. As indicated by the "ALL", reduced commands 502 and 503 are both to be executed. However, for purposes of this example, the order of execution of reduced commands 502 and 503 is not relevant to the implementation strategy for persistence command 501.

Reduced command 502 is again not understood (e.g., by instance store driver 106 or 306). Reduced command 502 is further reduced (e.g., by command reduction processor 109 or 309) into sequence 512, including reduced commands 522, 532, and 542. Reduced commands 522 and 542 are alternative implementations produced by invoking a command compiler (e.g., command compiler 362) to produce executable programs that may be run at an instance store (e.g., instance store 103 or 303). Reduced command 532 is a host implementation that is to be carried out on the machine containing the application host (e.g., 161 or 301) using the results from reduced command 522. Finally, reduced command 503 is able to be performed as a preferred implementation using an optimized command in the command set of the instance store (e.g., 106 or 306).

Thus, persistence command 501 is divided into two reduced commands. A first reduced command (502) is performed as a series of three further reduced commands. The first and third further reduced commands (522 and 542 respectively) are performed by the instance store using dynamically generated expressions (alternate implementations). The second further reduced command (532) performs a call back to the host (a host implementation). The second reduced command (503) is performed using a precompiled stored procedure (a preferred implementation).

Accordingly, embodiments of the invention facilitate increased compatibility between components in a persistence environment, such as, for example, between an application host and an instance store, when commands sets for components do not completely align.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A system for reducing persistence commands, the system comprising:
   one or more system processors;
   system memory;
   one or more computer storage media having stored thereon computer-executable instructions representing an application host, an instance store driver, a command reduction processor, and an instance store;
   an application host command set containing persistence commands compatible with the application host; and
   an instance store command set containing persistence commands compatible with the instance store; and
   wherein the application host is configured to:
      send a persistence command and a reducer call back to a persistence provider that contains the instance store driver, the persistence command from an application host command set, the reducer call back for calling a command reducer component associated with the application host command set, the command reducer component providing one or more implementation strategies for the persistence command;
      receive a call from the command reduction processor on the reducer call back;
      invoke the command reducer component in response to the call from the command reduction processor;
      select one or more reduced persistence commands for translation at the instance store driver for compatibility with the instance store command set, the one or more reduced persistence commands from the application host command set, the one or more reduced persistence commands representing a strategy for implementing the intent of at least a portion of the persistence command; and
      returning return_the one or more reduced persistence commands to the command reduction processor in response to the call on the reducer call back;
   wherein the instance store driver is configured to:
      receive the persistence command and the reducer call back from the persistence provider;
      detect an inability to translate the persistence command for compatibility with the instance store command set;
      send the persistence command along with the reducer call back to the command reduction processor in response to detecting the inability to translate the persistence command for compatibility with the instance store command set;
      receive the one or more reduced persistence commands from the command reduction processor; and
      execute the one or more reduced persistence commands to implement the strategy for implementing the intent of the at least a portion of the persistence command; and
   wherein the command reduction processor is configured to:
      receive the persistence command along with the reducer call back from the instance store driver;
      use the reducer call back to call the command reducer component for the persistence command;
      receive back the one or more reduced persistence commands from the command reducer component; and
      forward the one or more reduced persistence commands to the instance store driver for translation for compatibility with the instance store command set.

2. The system for reducing persistence commands as recited in claim 1, further comprising a command compiler, the command compiler configured to dynamically generate one of: an expression, computer program source code, and computer-executable instructions, to perform a portion of at least one of the one or more reduced persistence commands.

3. A method, implemented at a computer system that includes one or more processors, for reducing persistence commands, the method comprising:
   an act of an application host, which executes at the computer system, sending a persistence command and a reducer call back to a persistence provider that contains an instance store driver, the persistence command from an application host command set containing persistence commands compatible with the application host, the reducer call back for calling a command reducer component associated with the application host command set, the command reducer component providing one or more implementation strategies for the persistence command;
   an act of the instance store driver, which executes at the computer system, receiving the persistence command and the reducer call back from the persistence provider;
   an act of the instance store driver detecting an inability to translate the persistence command for compatibility with an instance store command set, which contains persistence commands compatible with the instance store;
   an act of the instance store driver sending the persistence command along with the reducer call back to a command reduction processor in response to detecting the inability to translate the persistence command for compatibility with the instance store command set;
   an act of the command reduction processor, which executes at the computer system, receiving the persistence command along with the reducer call back from the instance store driver;
   an act of the command reduction processor using the reducer call back to call the command reducer component for the persistence command;
   an act of the application host receiving a call from the command reduction processor on the reducer call back;

an act of the application host invoking the command reducer component in response to the call from the command reduction processor;

an act of the application host selecting one or more reduced persistence commands for translation at the instance store driver for compatibility with the instance store command set, the one or more reduced persistence commands from the application host command set, the one or more reduced persistence commands representing a strategy for implementing the intent of at least a portion of the persistence command;

an act of the application host returning the one or more reduced persistence commands to the command reduction processor in response to the call on the reducer call back;

an act of the command reduction processor receiving back the one or more reduced persistence commands from the command reducer component;

an act of the command reduction processor forwarding the one or more reduced persistence commands to the instance store driver for translation for compatibility with the instance store command set;

an act of the instance store driver receiving the one or more reduced persistence commands from the command reduction processor; and an act of the instance store driver executing the one or more reduced persistence commands to implement the strategy for implementing the intent of the at least a portion of the persistence command.

4. The method as recited in claim 3, further comprising a command compiler dynamically generating one of: an expression, computer program source code, and computer-executable instructions, to perform a portion of at least one of the one or more reduced persistence commands.

5. The method as recited in claim 3, further comprising subsequent to the command reduction processor forwarding the one or more reduced persistence commands to the instance store driver:

the command reduction processor receiving back a reduced persistence command, from among the one or more reduced persistence commands forwarded to the instance store driver, from the instance store driver, receiving the reduced persistence command indicative of an inability of the instance store driver to translate the reduced persistence command;

the command reduction processor further reducing the reduced persistence command into one or more further reduced persistence commands; and the command reduction processor forwarding the one or more further reduced persistence commands to the instance store driver for translation for compatibility with the instance store command set.

6. The method as recited in claim 3, wherein the command reduction processor receiving back the one or more reduced persistence commands from the command reducer component comprises:

receiving back a first reduced command from the command reducer component;

receiving back results of executing the first reduced command from the instance driver store;

submitting the results of executing the first reduced command to the command reducer component; and receiving back a second reduced command from the command reducer component, the second reduced command selected by the command reducer component based on the results of executing the first reduced command.

7. The method as recited in claim 3, wherein the command reduction processor receiving back one or more reduced persistence commands from the command reducer component comprises receiving a plurality of alternative implementations for at least one of the reduced commands.

8. The method as recited in claim 3, wherein the command reduction processor receiving back one or more reduced persistence commands from the command reducer component comprises receiving a plurality of reduced persistence commands that are to be executed in a specified order.

9. The method as recited in claim 8, wherein the specified order is a sequence.

10. The method as recited in claim 3, wherein the command reduction processor forwarding the one or more reduced persistence commands to the instance store driver comprises sending a preferred implementation for one of the reduced persistence commands, the preferred implementation including a command from the instance store command set.

11. The method as recited in claim 3, wherein the command reduction processor forwarding the one or more reduced persistence commands to the instance store driver comprises sending a host implementation for one of the reduced persistence commands, the host implementation indicating that at least one computation for one reduced persistence command is to be performed at the application host.

12. The method as recited in claim 3, further comprising subsequent to the application host returning the one or more reduced persistence commands to the command reduction processor:

receiving a call from the command reduction processor on a reducer call back for one of the one or more reduced persistence commands;

invoking the command reducer component for the reduced persistence command in response to the call from the command reduction processor;

further reducing the reduced persistence command into one or more further reduced persistence commands; and sending the one or more further reduced persistence commands to the command reduction processor.

13. The method as recited in claim 3, wherein the application host selecting one or more reduced persistence commands for translation at the instance store driver comprises selecting a host implementation for one of the reduced persistence commands, the host implementation indicating that at least one computation for the one reduced persistence command is to be performed at the application host.

14. The method as recited in claim 3, wherein the application host selecting one or more reduced persistence commands for translation at the instance store driver comprises selecting a preferred implementation for one of the reduced persistence commands, the preferred implementation including a command from the instance store command set.

15. The method as recited in claim 3, wherein the application host returning the one or more reduced persistence commands to the command reduction processor in response to the call on the reducer call back comprises:

sending a first reduced command to the command reduction processor;

receiving back results of executing the first reduced command from the command reduction processor;

selecting a second reduced command to further implement the persistence command based on the received results; and sending the reduced command to the command reduction processor.

16. The method as recited in claim 3, wherein the application host returning the one or more reduced persistence commands to the command reduction processor comprises sending a plurality of alternative implementations for at least one of the reduced commands.

17. The method as recited in claim 3, wherein the application host returning the one or more reduced persistence commands to the command reduction processor comprises sending a plurality of reduced persistence commands that are to be executed in a specified order.

18. The method as recited in claim 17, wherein the specified order is a sequence.

19. A computer program product comprising one or more computer-readable storage devices having stored thereon computer-executable instructions that, when executed by one or more processors of a computer system, cause the computer system to implement a method of reducing persistence commands, the method comprising:

an act of an application host, which executes at the computer system, sending a persistence command and a reducer call back to a persistence provider that contains an instance store driver, the persistence command from an application host command set containing persistence commands compatible with the application host, the reducer call back for calling a command reducer component associated with the application host command set, the command reducer component providing one or more implementation strategies for the persistence command;

an act of the instance store driver, which executes at the computer system, receiving the persistence command and the reducer call back from the persistence provider;

an act of the instance store driver detecting an inability to translate the persistence command for compatibility with an instance store command set, which contains persistence commands compatible with the instance store;

an act of the instance store driver sending the persistence command along with the reducer call back to a command reduction processor in response to detecting the inability to translate the persistence command for compatibility with the instance store command set;

an act of the command reduction processor, which executes at the computer system, receiving the persistence command along with the reducer call back from the instance store driver;

an act of the command reduction processor using the reducer call back to call the command reducer component for the persistence command;

an act of the application host receiving a call from the command reduction processor on the reducer call back;

an act of the application host invoking the command reducer component in response to the call from the command reduction processor;

an act of the application host selecting one or more reduced persistence commands for translation at the instance store driver for compatibility with the instance store command set, the one or more reduced persistence commands from the application host command set, the one or more reduced persistence commands representing a strategy for implementing the intent of at least a portion of the persistence command;

an act of the application host returning the one or more reduced persistence commands to the command reduction processor in response to the call on the reducer call back;

an act of the command reduction processor receiving back the one or more reduced persistence commands from the command reducer component;

an act of the command reduction processor forwarding the one or more reduced persistence commands to the instance store driver for translation for compatibility with the instance store command set;

an act of the instance store driver receiving the one or more reduced persistence commands from the command reduction processor; and an act of the instance store driver executing the one or more reduced persistence commands to implement the strategy for implementing the intent of the at least a portion of the persistence command.

* * * * *